Dec. 23, 1969 E. J. SCANLON 3,485,213
ANIMAL EXERCISING, CONDITIONING AND THERAPY, AND
APPARATUS THEREFOR
Filed Oct. 23, 1967
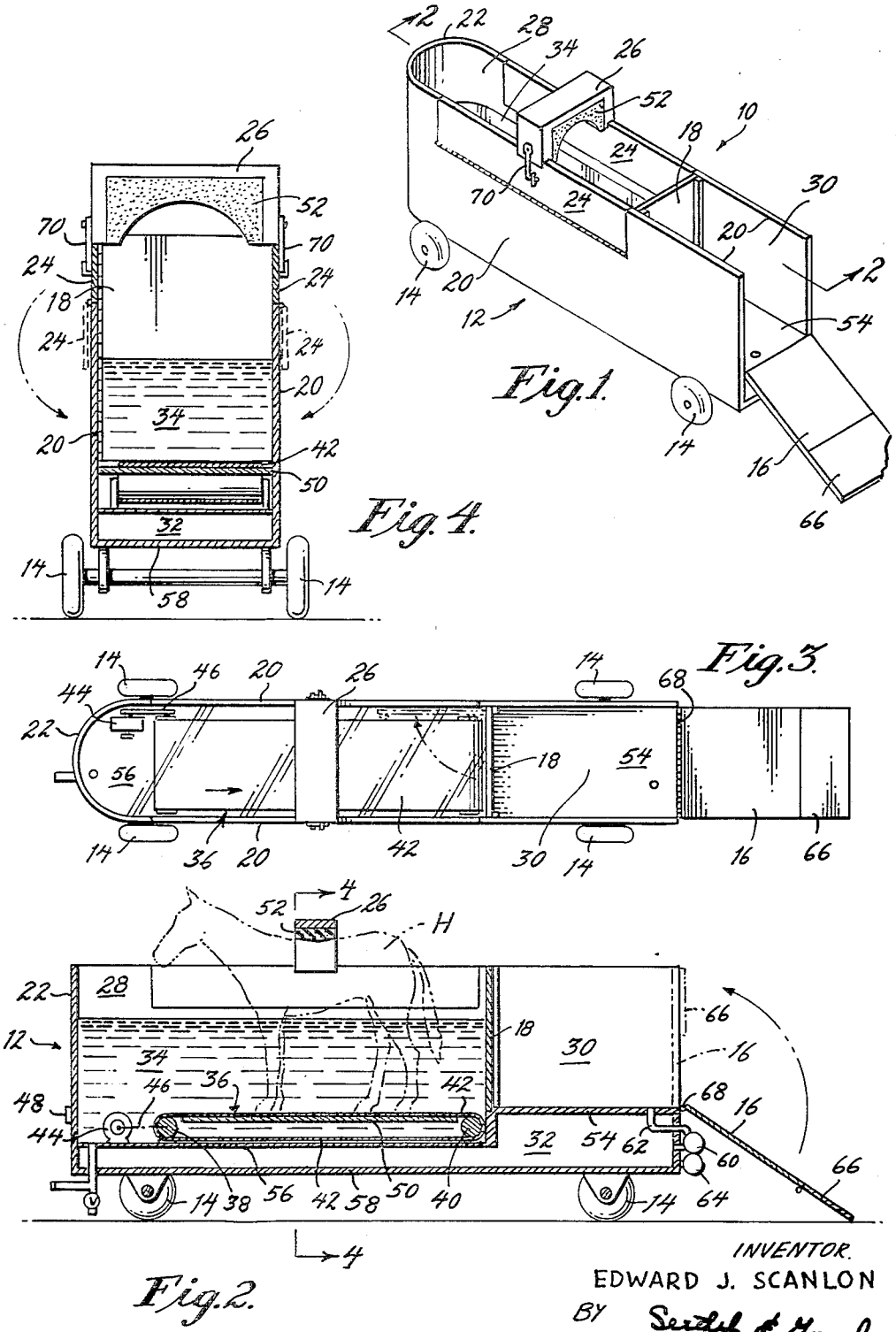
INVENTOR.
EDWARD J. SCANLON
BY
ATTORNEYS.

United States Patent Office 3,485,213
Patented Dec. 23, 1969

3,485,213
ANIMAL EXERCISING, CONDITIONING AND
THERAPY AND APPARATUS THEREFOR
Edward J. Scanlon, 101 Anton Road,
Wynnewood, Pa. 19096
Filed Oct. 23, 1967, Ser. No. 677,162
Int. Cl. A01k 29/00
U.S. Cl. 119—29                                9 Claims

ABSTRACT OF THE DISCLOSURE

An animal therapy, and an exercising and conditioning apparatus wherein a subject animal is made to run in a liquid medium, and wherein the speed of movement of the subject as well as the resistance of the medium may be varied by an operator as desired. The liquid medium may provide an external medicinal treatment for the animal, and the apparatus is so constructed that the medium may be retained in a storage compartment in the apparatus during admission or exit of the subject animal.

---

This invention relates to animal exercising, conditioning and therapy, and more particularly, to a method of treatment and exerciser and conditioner suitable for horses or the like.

The need for exercising horses, particularaly race horses, for routine conditioning and therapy is well known. Hence, it is customary to exercise such animals periodically in order to develop and maintain strength and muscle tone. This is most frequently accomplished on a track with saddle and rider, but such exercise is generally limited due to the risk of injury to the legs and hooves by the impact attendant running on relatively hard surfaces. Alternative forms of exercise have been proposed.

For example, in localities where feasible, animals have been run through surf, on the theory that the water provides increased resistance and consequently greater exercise value. A distinct disadvantage, however, of such a training method is the substantial risk of injury to the animal by water-hidden stones or holes, or by buffeting by waves.

It has also been proposed to permit swimming of the animal, either in a pool or in place in an apparatus provided for the purpose. An example of an apparatus for this purpose is disclosed in Patent 2,611,341. Swimming, however, does not necessarily exercise the muscles which come into play in running of the animal, and hence, the exercise provided thereby is not satisfactory in all respects. Moreover, it is demonstrable that a horse placed in a chamber of liquid such as that provided in the above-mentioned patent and suspended by collars and harness, will tend to "loaf" and quickly lose its stimulus to swim.

Yet another proposed exerciser for horses is the apparatus shown in Patent 2,969,768. This is simply a treadmill upon which the animal is made to run in place. Such apparatus shares with ordinary track exercising the risk of injury due to concussion or shock. With such apparatus, like track exercise, the risk of leg and hoof injury is a limiting factor, preventing exercise of the animal for long periods to obtain its full potential.

The present invention is a novel apparatus wherein the animal is made to run in place on a treadmill, the treadmill being disposed in an enclosure partially filled with liquid. The improved structure, for the first time, makes possible controlled correlation of the depth of the liquid, and consequently, the resistance encountered by the animal; and the speed at which the animal runs. Accordingly, the present invention makes possible a closely controlled exercise and conditioning program, tailored to the ability and condition of each subject animal. Moreover, the liquid medium in the enclosure, by slowing the animal's movements and by providing buoyancy, substantially diminishes the likelihood of concussive injury. By selection of a liquid of a particular viscosity, further control over the degree of exercise is obtained. The present invention provides the further benefit of permitting application of external medication during exercise, simply by adding medicants to the liquid medium. The apparatus may be placed on wheels for ready transport to wherever it is needed.

Other important aspects of the present invention are the manner in which the fluid is transferred to and from an exercising area and a storage area, filtered and heated when desired, and readied for re-use; and the unique construction whereby animals may be placed in the apparatus and removed therefrom without fluid loss.

In view of the foregoing, it is an object of this invention to provide a novel animal exerciser and conditioner.

It is another object of this invention to provide an exerciser and conditioner especially suitable for horses and the like.

It is still another object of this invention to provide an exerciser and conditioner wherein the conditions of actual running are closely simulated.

It is still another object of this invention to provide an exerciser and conditioner wherein the speed of the animal's movements and the resistance to such movements can be infinitely varied and closely correlated.

It is still another object of this invention to provide an apparatus wherein the concussive effects of running exercises are substantially diminished.

It is a further object of the present invention to provide an animal exerciser and conditioner wherein a fluid medium is retained in the apparatus, even while the subject animal is brought into and removed therefrom.

Other objects will appear hereinafter.

The foregoing and other objects are accomplished by an apparatus comprising an enclosure, an endless flexible member disposed within the enclosure adjacent its bottom wall, means for introducing fluid to and removing such fluid from the enclosure, means for driving the flexible member, and a control for selectively varying the speed of the driving means.

For the purpose of illustrating the invention, there is shown in the drawings a form which is presently preferred; it being understood, however, that this invention is not limited to the precise arrangements and instrumentalities shown.

FIGURE 1 is a perspective view showing the apparatus of the present invention.

FIGURE 2 is a side elevational view, in cross section, taken along the line 2—2 in FIGURE 1.

FIGURE 3 is a top plan view of the apparatus in accordance with the invention.

FIGURE 4 is an end elevation view, in cross section, taken along the line 4—4 in FIGURE 2.

Referring now to the drawings in detail, wherein like numerals indicate like elements, there is seen in FIGURE 1 an animal exerciser and conditioner designated generally by the reference numeral 10. The exerciser and conditioner 10 includes a tank structure designated generally by the reference numeral 12. The tank structure 12 may, if desired, be mounted on wheels 14, and includes a movable end gate 16 and an inner gate 18, both to be more fully described later. The tank structure 12 also includes spaced side walls 20 and an end wall 22. The side walls 20 may include drop panels 24. A bridge structure 26, also to be described more fully later, may be provided between the drop panels 24.

Referring now to FIGURES 2 to 4, the novel exerciser and conditioner of the present invention is seen in greater detail.

In FIGURE 2, it may be readily seen that the tank structure 12 is divided into an exercising area 28, a "dry lock" area 30, and a liquid storage area 32. As seen in the figure, the exercising area 28 is filled with a liquid 34. The liquid 34 may be ordinary water, or, for reasons to be explained, a more viscous liquid. Also, the liquid may contain medicants to be applied to the subject animal. The animal shown in FIGURE 2 is a horse, and henceforth for the purpose of description, the animal may be so described, it being understood that the principles of the present invention are applicable with equal facility to the exercising and conditioning of other animals as well.

An important feature of the present invention is the generally horizontally disposed movable member within the exercising area 28, which in the illustrated embodiment is a portion of a power-driven treadmill 36. The treadmill 36 includes spaced pivotably mounted sheaves 38 and 40, and a flexible endless belt 42 disposed around the sheaves. A motor 44 is coupled, by means of gearing 46, shown diagrammatically, to the sheave 38. Although shown within the exercising area 28, the motor may be placed at any convenient location. Actuation of the motor 44 drives the sheaves 38, and consequently the endless belt 42. Motor controls, diagrammatically shown and designated by the reference numeral 48, control the actuation and speed of the motor 44. Ideally, the controls 48 provide for infinitely variable speeds up to a selected maximum. The motor 44 may be electric, and the electrical source may be self-contained or external. Also in the exercising area 28, and below an upper flight of the flexible endless belt 42 is a support member 50. The horse, shown in phantom, may therefore stand directly on the upper flight of the belt 42, with its weight supported by the support member 50. The previously mentioned bridge member 26 includes a foam rubber or elastomeric pad 52 adapted to contact the back of the horse to keep it from rearing, advancing toward the end wall 22, or backing toward the end gate 16.

It should now be apparent that actuation of the motor 44 to cause motion of the belt 42 in the direction shown in FIGURE 3 will cause the horse to walk, jog or run, depending on the choice of belt speed. Each of the foregoing is encompassed within the term "ambulatory motion" as used hereinafter to described the motion induced by movement of the belt 42.

The previously mentioned dry lock area 30 is defined by the side walls 20, end gate 16, inner gate 18 and a floor member 54. Ideally, the inner gate 18 is of the swinging type, swingable inwardly toward the exercising area 28. Thus, the static pressure of the fluid 34 tends to more tightly close the inner gate. Suitable gaskets, not shown, may be placed at sealing edges of the gate 18. Closures other than the swinging type may be used if desired.

The floor member 54 separates the dry lock from a portion of the liquid storage area 32. A further floor portion 56 supports the treadmill 36 and separates the exercising area from a further portion of the liquid storage area. A bottom wall 58 of the tank 12 and the side walls 20 and front wall 22 complete the confines of the liquid storage area. A pump 60, best seen in FIGURE 2, which may be mounted within the tank 12 or in the locality shown, serves to transfer fluid from the lock area 30 to the liquid storage area 32, and vice versa. The arrangement of conduits associated with the pump 60 whereby the pump accomplishes its purposes is shown diagrammatically in FIGURE 2, and designated by the numeral 62. The particular arrangement used, as well as the necessary controls for the pump 60 (not shown) are such that they will occur to those of ordinary skill in the art. The filter 64 may be associated with the pump 60 to remove any filterable foreign matter from the liquid. Also, a heater, not shown, may be provided for the liquid. The procedure for placing an animal within the conditioner should now be apparent.

The end gate 16 in the illustrated embodiment is provided with an auxiliary panel 66 at its upper end. The panel 66 and its relation to the end gate 16 when the end gate is in its closed position is seen in phantom in FIGURE 2. In the solid line portion of FIGURE 2, as well as in FIGURES 1 and 3, it is seen that the panel 66 may be rotated to a position coplanar with the end gate 16, and rotation of the end gate about a hinge 68 securing it to the tank structure 12 causes the end gate and auxiliary panel to define an entrance ramp. The horse may be led up the ramp into the dry lock area 30, and the end gate 16 closed behind it. The end gate 16, it will be understood, is provided with liquid tight seals.

Prior to introduction of the animal into the dry lock area 30, the exercising area 28 and liquid storage area 32 are filled with liquid. In the case of the liquid storage area 32, this may be accomplished through fittings or openings, not shown, provided for the purpose. With the horse in the sealed dry lock area 30, the pump 60 may be actuated to transfer a portion of the liquid in the storage area 32 to the dry lock area. When the level of the liquid in the dry lock area is about equal to that in the exercising area 28, the inner gate 18 may be opened, and the horse led into the exercising area 28. The animal will then be standing on the flexible endless belt 42, as seen in phantom in FIGURE 2. The drop panels 24, which swing outwardly as shown in FIGURE 4, provide for easy access to the horse for positioning prior to exercising. During exercising, the drop panels 24 are in the position shown in FIGURE 1, and the bridge structure 26 secured thereto by any suitable fastening means. The latches 70, best seen in FIGURE 1, are merely illustrative. Removal of the animal from the exercising area and from the apparatus involves simply reversing the above-described procedure. Thus, the animal would be moved into the flooded dry lock area through the already open inner gate 18; the inner gate 18 closed; liquid pumped from the dry lock area into the liquid storage area; and finally, the end gate 16 lowered to its ramp-forming position.

The versatility and flexibility of operation of the above set forth apparatus should now be readily apparent. Changes in the speed of the treadmill 36, of course, necessitate changes in the gait of the exercising animal. Therefore, the speed of the belt controls the number, rapidity and degree of limb movement. Belt speeds varying between 5 and 10 feet per second have been found effective in producing satisfactory action of the limbs with good muscular contractions. With belt speeds much above 15 feet per second in liquid, horses tend to stumble and lose balance. On the other hand, if the treadmill speeds are too slow, full limb action and muscle flexion does not occur, although it has been found that the subject animal, due to the resistance of the liquid, gets far more exercise than would be received by action at corresponding speeds in air or on a track or road. The difference in the degree of exercise is difficult, of course, to measure precisely, but is readily apparent to the eye. The liquid, as indicated above, controls the resistance to movement encountered by the animal. The viscosity of the liquid can be changed to offer more or less resistance, and the liquid can be used as a vehicle for medication, for example fungicides for the treatment of certain dermatoses.

Moreover, the liquid applies a buoyant force on the animal, and its depth therefore regulates to a great extent the magnitude of the concussive forces on the hooves, limbs and body of the subject animal. Concussive forces are less as the depth of the liquid increases. Experimentation has shown that a depth of fluid which covers the limbs completely and barely reaches the underside of the abdomen is optimal. This depth proves adequate resistance to limb movement, yet does not result in objectionable waves and excessive agitation of the liquid in the exercising area.

In summary, with the present apparatus, various combinations of treadmill speed, depth of liquid, viscosity of liquid and time offer numerous combinations of exercising movement and exertion, and offer to the veterinarian or trainer the opportunity to prescribe a flexible exercise program to achieve many different objectives. In its broadest sense, therefore, the present invention is a method of therapy and of exercising and conditioning animals. The use of the moving surface in liquid results in a demonstrable synergistic action to produce a result not obtainable with one or the other, alone.

The benefits may be described as twofold, muscular and concussive. In regard to the first, the extensors and retractors of the fore and hind limbs are subjected, with the present apparatus, to greater stress and contraction than would be achieved on a treadmill in air or in track exercises. There are many conditions of lameness that are benefitted by exercise at slow belt speeds in a liquid medium. Reduction of concussion permits conditioning and strengthening of the muscles with far less risk of breakdown due to tendon, ligament, muscle and joint damage, which often results from presently known training methods.

It is apparent that humans could exercise and gain muscle tone and condition, and sustain beneficial effects in certain muscular, joint and bone abnormalities with the present method and apparatus as well as the lower animals. The same physiological principles are involved. Some slight modifications, for instance hand-rails for support, would be helpful, but the basic concept of forced exercise in a fluid medium would be unchanged.

As used hereinafter, and for the purpose of definition, the above-described exercising area may be termed an upright enclosure. Such term may also include, as will be understood, any area capable of retaining fluid in the required manner. For example, a below-ground "pool" may be so described. Also, the term movable member may be used generically to describe the belt 42 or the like, and it will be understood that more than one such member can be used in a given enclosure, or a common structure with multiple enclosure and members may be used.

The present invention may be embodied in other specific forms without departing from the spirit or essential attributes thereof.

I claim:

1. Apparatus for exercising and conditioning animals comprising an upright enclosure for receiving and retaining a quantity of liquid, a generally horizontally disposed movable member within said enclosure at a bottom portion thereof providing a surface upon which an animal can stand adapted to be immersed in the liquid, drive means coupled to said member for moving said member to induce ambulatory motion of an animal thereon, control means coupled to said drive means for selectively varying the speed of said drive means so that the speed of movement of the animal may be controlled, and means for conducting liquid to and from said enclosure to selectively vary the height of the liquid, whereby the resistance to movement due to the liquid can be correlated with the speed of said drive means to provide a controlled exercise for an animal.

2. Apparatus in accordance with claim 1 wherein said movable member is a flexible endless belt, said surface upon which an animal can stand being an upper flight of said belt.

3. Apparatus in accordance with claim 1 including a lock area associated with said enclosure, said lock area including a pair of spaced movable closure members, a liquid storage area in communication with said lock area, and means for transferring liquid between said lock area and said liquid storage area to permit an animal to enter said enclosure without loss of fluid therefrom.

4. Apparatus in accordance with claim 3 wherein said movable member is a flexible endless belt, said surface upon which an animal can stand being an upper flight of said belt.

5. Apparatus in accordance with claim 3, wherein said enclosure, lock area and liquid storage area are portions of a unitary tank structure, said structure being supported by ground-engaging wheels.

6. A method of exercising and conditioning animals comprising the steps of providing an upright liquid retaining enclosure, placing a quantity of liquid within the enclosure sufficient to cover only a portion of the legs of an animal therein, introducing an animal into said enclosure, retaining the animal in said enclosure, and inducing the animal to engage in ambulatory motion in place within said enclosure against the resistance of said liquid by moving the surface on which the animal is supported.

7. A method in accordance with claim 6 comprising the further step of varying the height of the liquid medium in the enclosure to alter the fluid resistance and buoyant force applied by the liquid to the animal.

8. A method in accordance with claim 6 comprising the further step of selecting a liquid medium of desired viscosity to alter the fluid resistance applied by the liquid to the animal.

9. A method in accordance with claim 6 comprising the further steps of varying the height of the liquid medium in the enclosure to alter the fluid resistance and buoyant force applied by the liquid to the animal, and inducing the animal to change the speed of its ambulatory motion to alter the fluid resistance applied thereto by the liquid.

References Cited

UNITED STATES PATENTS

| 748,829 | 1/1904 | Winnie | 119—158 |
| 774,279 | 11/1904 | Seabury | 119—159 |
| 2,611,341 | 9/1952 | Paris | 119—158 |
| 2,969,768 | 1/1961 | Grant | 119—29 |
| 3,060,892 | 10/1962 | Schantz | 119—158 |
| 3,119,374 | 1/1964 | Ladner | 119—29 |

HUGH R. CHAMBLEE, Primary Examiner

U.S. Cl. X.R.

119—158; 128—66